United States Patent
Nomura

(12) 
(10) Patent No.: US 10,442,148 B2
(45) Date of Patent: Oct. 15, 2019

(54) FILLER-RAISING DEVICE

(71) Applicants: FUJI SEIKO CO., LTD., Hashima-shi, Gifu-ken (JP); FUJI SHOJI CO., LTD., Hashima-shi, Gifu-ken (JP)

(72) Inventor: Shigeaki Nomura, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 26 days.

(21) Appl. No.: 15/513,784

(22) PCT Filed: Oct. 3, 2014

(86) PCT No.: PCT/JP2014/076555
§ 371 (c)(1),
(2) Date: Mar. 23, 2017

(87) PCT Pub. No.: WO2016/051590
PCT Pub. Date: Apr. 7, 2016

(65) Prior Publication Data
US 2017/0291378 A1    Oct. 12, 2017

(51) Int. Cl.
*B29D 30/00* (2006.01)
*B29D 30/48* (2006.01)

(52) U.S. Cl.
CPC ......... *B29D 30/0016* (2013.01); *B29D 30/48* (2013.01); *B29D 2030/0044* (2013.01); *B29D 2030/482* (2013.01)

(58) Field of Classification Search
CPC .... B29D 2030/2621; B29D 2030/2628; B29D 2030/265; B29D 2030/2657; B29D 2030/481–2030/486; B29D 30/26
See application file for complete search history.

(56) References Cited

U.S. PATENT DOCUMENTS

| 3,185,607 | A | * | 5/1965 | Nebout | B29D 30/50 156/132 |
| 3,560,301 | A | * | 2/1971 | Cantarutti | B29D 30/32 156/401 |
| 3,560,302 | A | * | 2/1971 | Missioux | B29D 30/36 156/415 |
| 4,087,298 | A | * | 5/1978 | Mangun | B29D 30/48 156/136 |

(Continued)

FOREIGN PATENT DOCUMENTS

| JP | 60-1981 U | 1/1985 |
| JP | 02-62232 A | 3/1990 |

(Continued)

OTHER PUBLICATIONS

International Search Report for Application No. PCT/JP2014/076555 dated Dec. 22, 2014.

(Continued)

*Primary Examiner* — Tyrone V Hall, Jr.
(74) *Attorney, Agent, or Firm* — Tarolli, Sundheim, Covell & Tummino LLP

(57) ABSTRACT

Disclosed is a filler-raising device that raises a filler upright to couple the filler with a bead core. The filler-raising device includes a balloon that raises the filler upright toward the bead core and an air controller that supplies air into the balloon and draws air out of the balloon.

1 Claim, 4 Drawing Sheets

(56) References Cited

U.S. PATENT DOCUMENTS

| | | | | |
|---|---|---|---|---|
| 4,163,683 A | * | 8/1979 | Lammlein, Jr. | B29D 30/48 |
| | | | | 156/136 |
| 4,214,939 A | * | 7/1980 | Enders | B29D 30/245 |
| | | | | 156/132 |
| 4,243,451 A | * | 1/1981 | Kortman | B29D 30/20 |
| | | | | 156/132 |
| 6,615,891 B2 | * | 9/2003 | Farinola | B29D 30/0654 |
| | | | | 156/398 |
| 6,955,531 B2 | * | 10/2005 | Wu | F04B 33/00 |
| | | | | 137/231 |
| 2011/0072664 A1 | * | 3/2011 | Marchini | B29D 30/244 |
| | | | | 29/894.3 |

FOREIGN PATENT DOCUMENTS

| | | |
|---|---|---|
| JP | 7-005724 U | 1/1995 |
| JP | 7-088848 A | 4/1995 |
| JP | 2001-096640 A | 4/2001 |

OTHER PUBLICATIONS

International Preliminary Report on Patentability for Application No. PCT/JP2014/076555 dated Apr. 4, 2017.

* cited by examiner

FILLER-RAISING DEVICE

RELATED APPLICATIONS

The present invention is a U.S. National Stage under 35 USC 371 patent application, claiming priority to Serial No. PCT/JP2014/076555, filed on 3 Oct. 2014; the entirety of which is incorporated herein by reference.

TECHNICAL FIELD

The present invention relates to a filler-raising device.

BACKGROUND ART

An assembling apparatus that assembles a bead unit, which is an assembly of a filler and a bead core, is known in the prior art. Patent document 1 describes an example of an assembling apparatus that uses a filler-raising device to raise a filler upright from a state lying horizontally beside the bead core. The filler-raising device raises the filler upright by supplying air to a balloon located at a position corresponding to a bottom surface of the filler that is lying horizontally.

Prior Art Document

Patent Document

Patent Document 1: Japanese Laid-Open Patent Publication No. 2-62232

SUMMARY OF THE INVENTION

Problems That are to be Solved by the Invention

The filler-raising device described above supplies pressurized air to inflate the balloon. Further, the filler-raising device deflates the balloon through natural discharge of the air. The filler and the bead core that have been coupled to each other cannot proceed to the next step until the balloon deflates through natural air discharge. This prolongs the work time. Thus, there is room for improving the working efficiency.

It is an object of the present invention to provide a filler-raising device that improves the working efficiency.

Means for Solving the Problem

To achieve the above object, the present invention provides a filler-raising device that raises a filler upright to couple the filler with a bead core. The filler-raising device includes a balloon that raises the filler upright toward the bead core and an air controller that supplies air into the balloon and draws air out of the balloon.

With the above structure, the air controller draws air out of the balloon. This deflates the balloon more quickly than a structure that relies on natural air discharge to deflate the balloon. Thus, the working efficiency is improved.

Effect of the Invention

The filler-raising device according to the present invention succeeds in improving the working efficiency.

MODES FOR CARRYING OUT THE INVENTION

One embodiment of the present invention will now be described.

Figure 1:
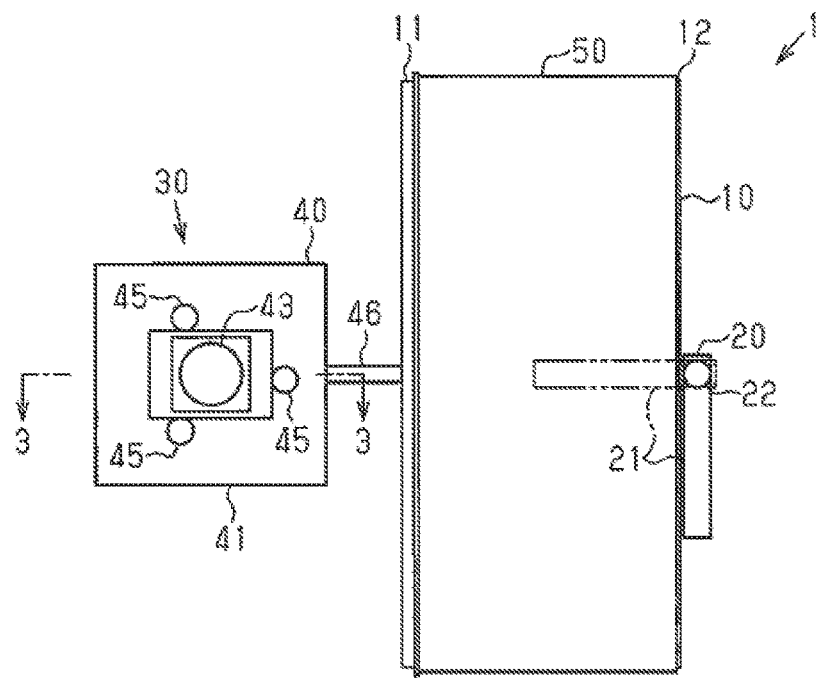
FIG. 1 is a plan view of a bead unit assembling apparatus including a filler-raising device according to one embodiment.

As shown in FIG. 1, a bead unit assembling apparatus 1 includes a shaping drum 10, a pressing device 20 that winds a filler 70 (refer to FIG. 4) around the shaping drum 10, and a filler-raising device 30 that raises the filler 70 (refer to FIG. 4) upright.

The shaping drum 10 has an outer circumference that includes a first mounting portion 11 and a second mounting portion 12. The first mounting portion 11 is a small diameter portion defined by the outer circumference of the shaping drum 10 at one axial end. The second mounting portion 12 is a large diameter portion defined by the outer circumference of the shaping drum 10 next to the first mounting portion 11 in the axial direction of the shaping drum 10. The shaping drum 10 is able to decrease and increase the diameter of the first mounting portion 11.

Figure 2:
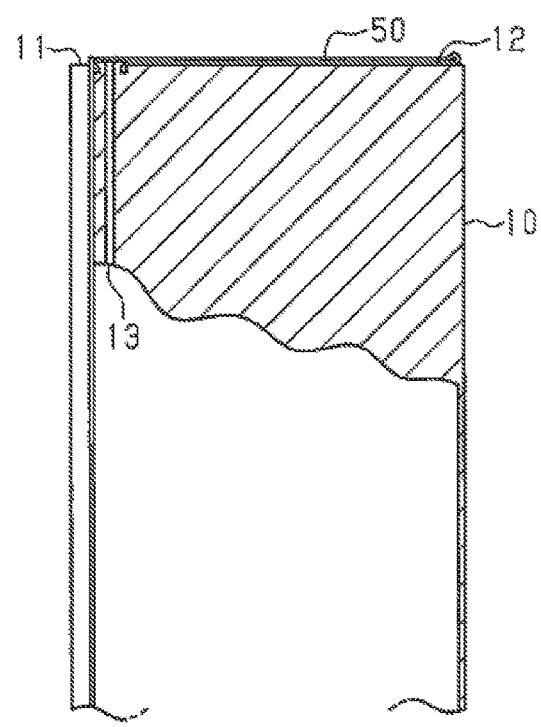
FIG. 2 is a partially cross-sectional view of a shaping drum shown in FIG. 1.

As shown in FIG. 2, a balloon 50 is arranged on the outer circumference of the second mounting portion 12. The shaping drum 10 includes a passage 13 through which air is supplied into the balloon 50 and drawn out of the balloon 50.

As shown in FIG. 1, the pressing device 20 includes a pressing member 21 and a driver 22, which moves the pressing member 21. The driver 22 moves the pressing member 21 between a standby position (position indicated by solid lines in FIG. 1), where the pressing member 21 is separated from the second mounting portion 12, and a pressing position (position indicated by double-dashed lines in FIG. 1), where the pressing member 21 is located on the second mounting portion 12 downward from the standby position.

The filler-raising device 30 includes an air controller 40 and the balloon 50.

Figure 3:
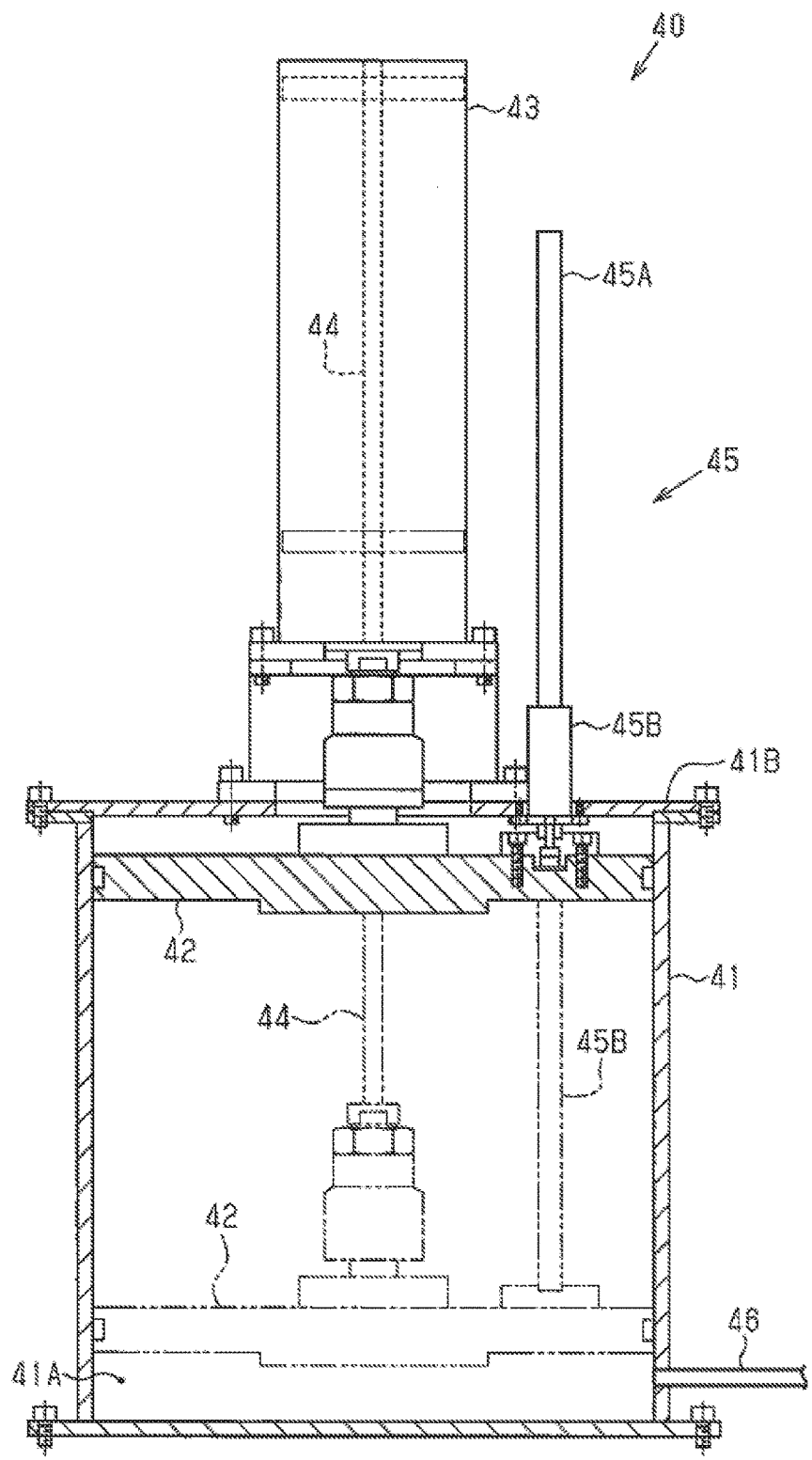
FIG. 3 is a cross-sectional view of an air controller taken along line 3-3 in FIG. 1.

As shown in FIG. 3, the air controller 40 includes a cylinder case 41, a piston 42 that moves the air in the cylinder case 41 to the balloon 50 (refer to FIG. 2) and back to the cylinder case 41, an air cylinder 43 serving as an actuator that drives the piston 42, guides 45 (refer to FIG. 1) that guide movement of the piston 42, and a tube 46 that connects the cylinder case 41 and the passage 13 (refer to FIG. 2).

The piston 42 defines a storage section 41A with part of the space in the cylinder case 41. The air cylinder 43 includes a rod 44 that moves when the air cylinder 43 is driven. The rod 44 includes a distal end coupled to the top surface of the piston 42.

Figure 6:
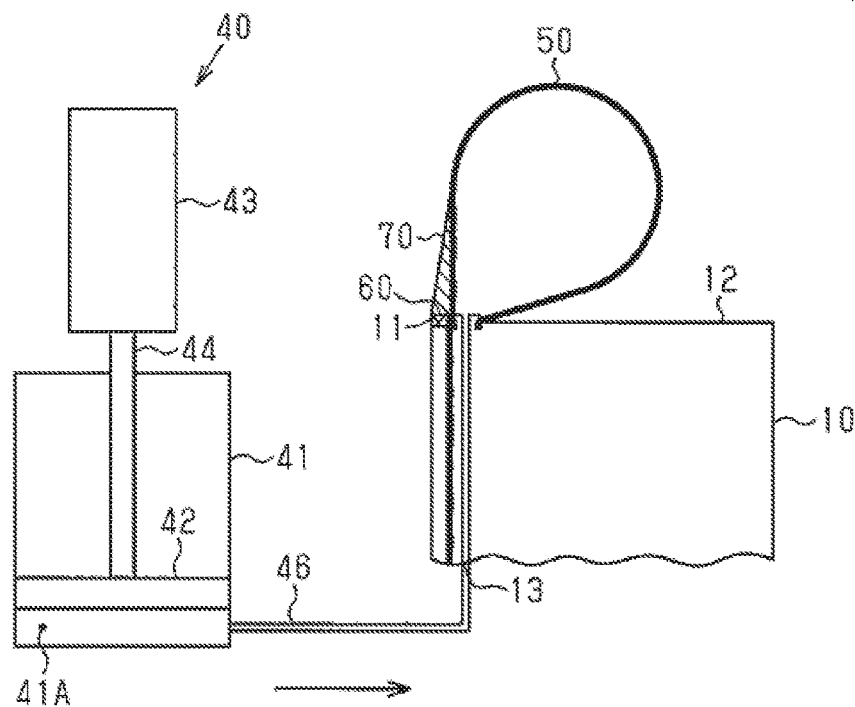
FIG. 6 is a third process diagram illustrating the bead unit-assembling step.

When the air cylinder 43 is driven, the piston 42 is moved between a position where the volume of the storage section 41A in the cylinder case 41 is the maximum (position indicated by solid line in FIG. 3) and a position where the volume of the storage section 41A is the minimum (position indicated by double-dashed line in FIG. 3). The maximum volume of the storage section 41A is larger than the volume of the balloon 50 when the balloon 50 is inflated to the maximum as shown in FIG. 6.

The guides 45 each include a guide rod 45A that extends parallel to the rod 44 and a guide tube 45B that is fixed to a top portion 41B of the cylinder case 41. The guide rod 45A includes a distal end coupled to the top surface of the piston 42 and an intermediate portion inserted into the guide tube 45B. The guide rod 45A is moved together with the rod 44 and the piston 42. As shown in FIG. 1, the three guides 45 are arranged around the rod 44. This restricts tilting of the piston 42 relative to the rod 44 when the piston 42 moves.

A method for coupling the filler 70 with a bead core 60 will now be described with reference to FIGS. 1 and 4 to 7.

Figure 4:
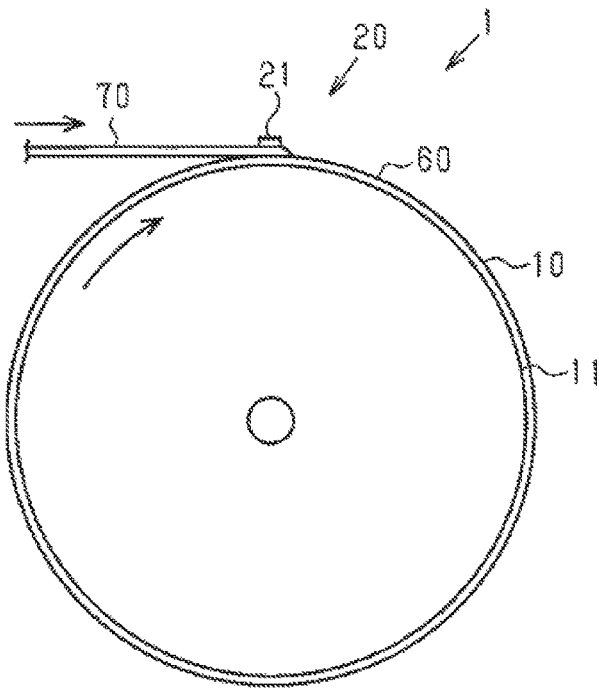
FIG. 4 is a first process diagram illustrating a bead unit-assembling step that uses the bead unit assembling apparatus of FIG. 1.

As shown in FIG. 4, the bead unit assembling apparatus 1 mounts the bead core 60 onto the first mounting portion 11. More specifically, the bead core 60 is arranged on the first mounting portion 11, the diameter of which has been decreased. Then, the first mounting portion 11 is increased in diameter so that the bead core 60 is mounted onto the first mounting portion 11.

Next, a filler feeding device (not shown) arranges a front end of the filler 70 onto the second mounting portion 12 (refer to FIG. 1). Then, the driver 22 moves the pressing member 21 from the standby position indicated by solid lines in FIG. 1 to the pressing position indicated by double-dashed lines in FIG. 1. As shown in FIG. 4, the pressing member 21 presses the front end of the filler 70 against the balloon 50. In this state, the shaping drum 10 is rotated to wind the filler 70 around the outer circumference of the shaping drum 10. When the shaping drum 10 completes a single rotation, a cutting device (not shown) cuts the filler 70 at a location separated by a predetermined distance from the front end of the filler 70. The rear end of the filler 70 that has been cut is compression-bonded to the front end of the filler 70 by a compression-bonding device (not shown).

Figure 5:
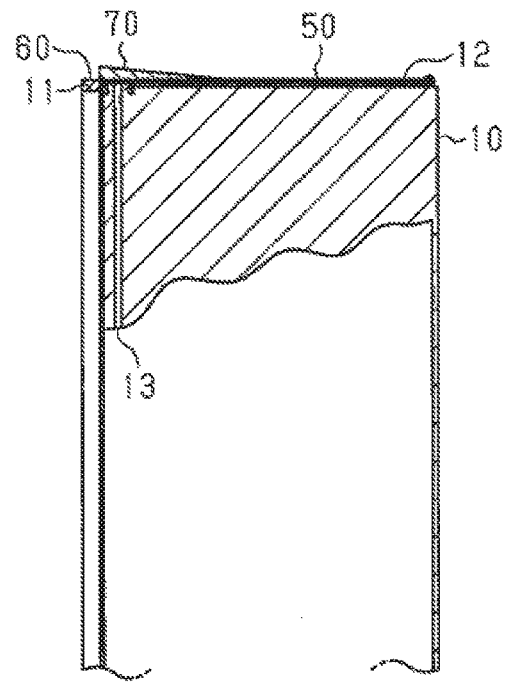
FIG. 5 is a second process diagram illustrating the bead unit-assembling step.

As shown in FIG. 5, after the above steps have been performed, the filler 70 will be lying horizontally beside the bead core 60. Then, as shown in FIG. 6, the air controller 40 drives the air cylinder 43 to downwardly move the piston 42 in the cylinder case 41. Thus, air is supplied from the storage section 41A through the tube 46 and the passage 13 into the balloon 50. This inflates the balloon 50. As a result, the end of the filler 70 that is located close to the bead core 60 moves onto the bead core 60, and the filler 70 rises upright. That is, the filler 70 is raised upright on the bead core 60. This couples the bead core 60 and the filler 70 and forms a bead unit 80.

Figure 7:
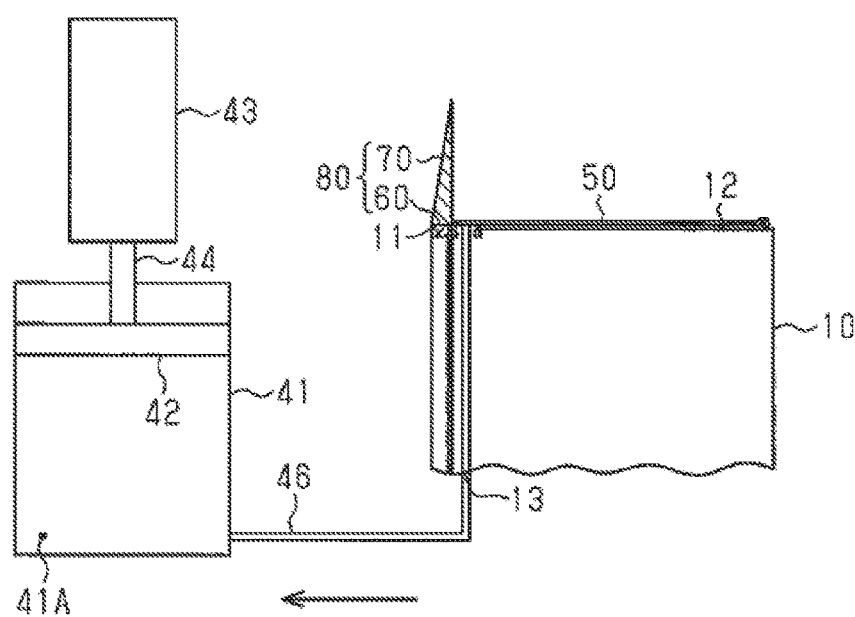
FIG. 7 is a fourth process diagram illustrating the bead unit-assembling step.

Next, as shown in FIG. 7, the air controller 40 drives the air cylinder 43 to upwardly move the piston 42 in the cylinder case 41. As a result, the pressure becomes negative in the storage section 41A of the cylinder case 41. Thus, air is drawn out of the balloon 50, and the balloon 50 is deflated. Then, the bead unit 80, which has been assembled, is removed from the shaping drum 10 to undergo the next process.

The embodiment has the advantages described below.

(1) The air controller 40 of the filler-raising device 30 draws air out of the balloon 50. This deflates the balloon 50 more quickly than a structure that relies on natural air discharge to deflate the balloon 50. Thus, the working efficiency is improved.

(2) The air controller 40 uses the same air cylinder 43 to supply air into the balloon 50 and draw air out of the balloon 50. This simplifies the structure of the air controller 40 as compared with a structure that supplies air into the balloon 50 with a supplying device and draws air out of the balloon 50 with a separate drawing device.

(3) When using an electric pump to draw air out of the balloon 50, a decrease in the pressure of the balloon 50 will lower the air drawing efficiency. In contrast, the air controller 40 uses the piston 42 to draw air out of the balloon 50. This limits decreases in the air drawing efficiency as compared with when using an electric pump.

(4) When an electric pump is arranged between the storage section 41A and the balloon 50 to supply the balloon 50 with air from the storage section 41A, a decrease in the pressure of the storage section 41A will lower the air supplying efficiency. In contrast, the air controller 40 uses the piston 42 to supply the balloon 50 with air. This limits decreases in the air supplying efficiency as compared with when using an electric pump.

(5) The maximum volume of the storage section 41A is larger than the volume of the balloon 50 when inflated to the maximum. This allows the balloon 50 to be inflated to the maximum using only the air of the storage section 41A.

The above embodiment may be modified as described below.

The air controller 40 may be replaced by an air controller including a supplying device that supplies air into the balloon 50 and a drawing device that draws air out of the balloon 50. In this case, the supplying device may be, for example, an electric pump. Further, the drawing device may be an electric pump that differs from the supplying device.

The air controller 40 may include a rotary-type air cylinder that rotates the piston 42 in the cylinder case 41.

An electric motor may be used as an actuator that drives the piston 42. In this case, a mechanism that converts rotational motion to linear motion, for example, a ball screw, is arranged between the electric motor and the rod 44.

DESCRIPTION OF REFERENCE CHARACTERS

30 . . . filler-raising device, 40 . . . air controller, 41 . . . cylinder case, 42 . . . piston, 43 . . . air cylinder (actuator), 50 . . . balloon, 60 . . . bead core, 70 . . . filler.

The invention claimed is:

1. A filler-raising device that raises a filler upright to couple the filler with a bead core, the filler-raising device comprising:
   a balloon that raises the filler upright toward the bead core; and
   an air controller that supplies air into the balloon and draws air out of the balloon, the air controller including a cylinder case, a piston located in the cylinder case, and an actuator that moves the piston,
   wherein the piston defines a storage section for air in the cylinder case,
   wherein the storage section has a volume that is varied when the piston moves, and
   wherein the storage section has a maximum volume that is larger than a volume of the balloon when the balloon is inflated to the maximum.

* * * * *